United States Patent
Voll et al.

(10) Patent No.: US 10,605,062 B2
(45) Date of Patent: Mar. 31, 2020

(54) DOWNHOLE FLOW CONTROL DEVICE

(71) Applicant: Swellfix UK Limited, Eastleigh, Hampshire (GB)

(72) Inventors: Benn Voll, Hundvaag (NO); Ismarullizam Mohd Ismail, Aberdeen (GB)

(73) Assignee: Swellfix UK Limited, Hampshire (GB)

( * ) Notice: Subject to any disclaimer, the term of this patent is extended or adjusted under 35 U.S.C. 154(b) by 177 days.

(21) Appl. No.: 15/507,895

(22) PCT Filed: Sep. 30, 2015

(86) PCT No.: PCT/IB2015/057485
§ 371 (c)(1),
(2) Date: Mar. 1, 2017

(87) PCT Pub. No.: WO2016/059501
PCT Pub. Date: Apr. 21, 2016

(65) Prior Publication Data
US 2017/0306738 A1 Oct. 26, 2017

(30) Foreign Application Priority Data
Oct. 13, 2014 (GB) .................. 1418062.4

(51) Int. Cl.
*E21B 43/12* (2006.01)
*E21B 43/14* (2006.01)
(Continued)

(52) U.S. Cl.
CPC .............. *E21B 43/32* (2013.01); *E21B 7/06* (2013.01); *E21B 34/085* (2013.01);
(Continued)

(58) Field of Classification Search
CPC ........... E21B 34/08; E21B 43/12; E21B 43/14
See application file for complete search history.

(56) References Cited

U.S. PATENT DOCUMENTS 7,819,196 B2 * 10/2010 Aakre ............... E21B 34/08
166/369
9,534,470 B2 * 1/2017 Aakre ............... E21B 43/12
(Continued)

FOREIGN PATENT DOCUMENTS

DE 4220586 A1 1/1994
EP 2663733 A2 11/2013
(Continued)

OTHER PUBLICATIONS

International Search Report PCT/ISA/210 for International Application No. PCT/IB/2015/057485 dated Jan. 7, 2016.
(Continued)

*Primary Examiner* — Catherine Loikith
(74) *Attorney, Agent, or Firm* — Harness, Dickey & Pierce, P.L.C.

(57) ABSTRACT

A downhole flow control device includes a housing, an inlet port, an outlet port and a valve seat surface surrounding the inlet port. A valve plate is mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet. At least one of the valve seat and valve plate defines a geometry to encourage an increase in static pressure of fluid flow in the separation flow path when the valve plate is in the open position.

26 Claims, 5 Drawing Sheets

(51) Int. Cl.
*E21B 34/08* (2006.01)
*E21B 43/32* (2006.01)
*F16K 15/02* (2006.01)
*E21B 34/10* (2006.01)
*E21B 7/06* (2006.01)
*E21B 21/10* (2006.01)

(52) U.S. Cl.
CPC ............ *E21B 34/108* (2013.01); *E21B 43/12* (2013.01); *E21B 43/14* (2013.01); *F16K 15/023* (2013.01); *E21B 21/10* (2013.01)

(56) References Cited

U.S. PATENT DOCUMENTS

| 2010/0186832 | A1 | 7/2010 | Johannesen |
| 2011/0011590 | A1 | 1/2011 | Mathiesen et al. |
| 2014/0218733 | A1 | 8/2014 | Mathiesen et al. |

FOREIGN PATENT DOCUMENTS

| NO | 20130869 | A1 | 8/2011 |
| WO | WO-2008/004875 | A1 | 1/2008 |
| WO | WO-2008/143522 | A1 | 11/2008 |
| WO | WO-2009-088292 | A1 | 7/2009 |
| WO | WO-2009/088293 | A1 | 7/2009 |
| WO | WO-2010/053378 | A2 | 5/2010 |
| WO | WO-2012/095196 | A2 | 7/2012 |
| WO | WO-2013/034184 | A1 | 3/2013 |
| WO | WO-2013/034185 | A1 | 3/2013 |

OTHER PUBLICATIONS

Written Opinion of the International Searching Authority PCT/ISA/237 for International Application No. PCT/IB/2015/057485 dated Jan. 7, 2016.

Great Britain Search Report for Great Britain Application No. GB1418062.4 dated Mar. 13, 2015.

Vidar Mathiesen et al., "The Autonomous RCP Valve—New Technology for Inflow Control in Horizontal Wells," Society of Petroleum Engineers, XP009719559, 2011, pp. 1-10.

Examination Report dated Jul. 5, 2019, issued in corresponding Australian Patent Application No. 2015332140.

* cited by examiner

DOWNHOLE FLOW CONTROL DEVICE

CROSS-REFERENCE TO RELATED APPLICATIONS

This application is the U.S. National Phase application of PCT Application No. PCT/IB2015/057485 filed on Sep. 30, 2015, which claims priority to Great Britain Application No. 1418062.4 filed on Oct. 13, 2014 the entire contents of each of which are incorporated herein by reference.

FIELD

The present invention relates to a downhole flow control device, and in particular to a downhole flow control device which can facilitate flow of a fluid such as a gas in one direction while preventing flow in a reverse direction.

BACKGROUND

In the oil and gas industry wellbores are drilled from surface to intercept subterranean hydrocarbon bearing formations. It is known to extend completion equipment into a drilled wellbore to facilitate appropriate inflow of subterranean fluids and subsequent safe retrieval to surface. The completion equipment may include a production pipe string which carries a number of packers on an outer surface thereof such that when the packers are set multiple axially spaced and isolated production zones may be established. The production pipe string may include one or more inflow devices within each zone, to facilitate inflow of formation fluids. A basic form of inflow device includes a port in a wall of the production pipe string. However, other forms may include nozzles which can provide a desired fluid choking effect, Different zones may be fitted with inflow control nozzles or devices of different design, providing a variation in inflow restriction across different zones. This variation may be used to provide a more balanced production of formation fluids across the different zones, which might assist to provide more even hydrocarbon recovery and delay breakthrough of undesired fluids, such as water and gas.

In some instances an inflow control device may function as a valve, to selectively open and close in accordance with user preference and/or fluid properties. For example, Autonomous Inflow Control Devices (AICDs) are known which can permit the inflow of a liquid hydrocarbon, but automatically close or choke flow of water or a gas. Some AICD designs function on the basis of the changing fluid inflow velocity, which will be a function of the fluid viscosity and density.

It may be desirable in some wellbore operations to restrict or prevent backflow of a fluid from a production pipe string into a surrounding formation. Further, it may be desirable to restrict or prevent cross-flow of fluid from a higher pressure zone to a lower pressure zone.

SUMMARY

Aspects of the present invention relate to a downhole flow control device and methods which may facilitate inflow or outflow relative to a tubular, such as a downhole tubular. The device may function as a check valve, to facilitate flow in one direction only. The device may be suitable for use with gas flow, and may minimise sensitivities associated with the flow of low viscosity fluids such as gases. For example, the device may include a geometry within an internal flow path which assists to encourage an increase in static pressure which may be used to contribute to an opening force on the device.

An aspect of the present invention relates to a downhole flow control device, comprising:
a housing to be secured within a wall of a tubular and comprising an inlet port, an outlet port and a valve seat surface surrounding the inlet port;
a valve plate mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet,
wherein at least one of the valve seat and valve plate defines a geometry to encourage an increase in static pressure of fluid flow in the separation flow path when said valve plate is in its open position.

In use the downhole flow control device may be used to control flow between internal and external spaces of a tubular, such as a wellbore tubular. The external space may include a wellbore annulus. The downhole flow control device may be used to function as a check valve, allowing flow in a forward direction while restricting flow in a reverse direction.

The downhole flow control device may be used to function as an intake device or valve, for example a production intake device or valve. In such an arrangement the device may be oriented within the wall of the tubular such that the forward direction permits inflow of fluids into the tubular, while outflow is restricted.

The device may also or alternatively be used to function as an outlet device or valve, for example an injection outlet device or valve. In such an arrangement the device may be oriented within the wall of the tubular such that the forward direction permits outflow of fluids from the tubular, while inflow is restricted.

A single device may be suitable for use as either an inflow or an outflow device, depending on the orientation of the device when secured to the tubular.

The valve plate may autonomously close in response to reverse flow through the device.

The valve plate may be moveable between open and closed positions in response to a differential pressure applied over opposing surfaces of the valve plate.

The valve plate may define an inlet surface. The inlet surface may be exposed to an inlet or upstream fluid pressure. The valve plate may define an outlet surface which is opposed to the inlet surface. The outlet surface may be exposed to an outlet or downstream fluid pressure. In this respect "upstream" and "downstream" regions of the device may be delineated in the region of fluid exit from the separation flow path during forward flow. In some embodiments the outlet surface may be generally planar.

The inlet or upstream pressure applied over the inlet surface of the valve plate may act to urge the valve plate towards its open position. Similarly, the outlet or downstream pressure applied over the outlet surface of the valve plate may act to urge the valve plate towards its closed position. Accordingly, when the upstream pressure force is dominant the valve plate will move towards and be held in its open position. Conversely, when the downstream pressure force is dominant the valve plate will tend towards and be held in its closed position.

Encouraging an intentional increase in the static pressure within the separation flow path may increase the effective pressure (for example upstream pressure) applied over the inlet surface, thus assisting to maintain the valve plate in an open position during forward flow.

At least one of the valve seat and valve plate may define a geometry to encourage a reduction in dynamic pressure with a corresponding increase in static pressure of fluid flow in the separation flow path when said valve plate is in its open position. As such, the geometry may be configured to encourage conversion of dynamic pressure to static pressure within the separation flow path.

The ability to increase static pressure, for example by encouraging a reduction in dynamic pressure, within the separation flow path may assist to reduce the sensitivity of the device to different fluid types and viscosities and/or densities. For example, a gas may have a lower viscosity and/or density than a liquid, such that the gas would seek to flow faster along the separation flow path of the device, with less velocity losses due to lower skin drag forces and the like. Such a faster flow would inherently increase the dynamic pressure at the expense of static pressure, reducing the available pressure force to hold the valve plate open. This phenomenon (of a lower opening pressure during lower viscosity and/or density fluid flow) is used in known autonomous inflow control devices (AICDs), which effectively autonomously close in the event of a fluid change from higher viscosity/density to lower viscosity/density, such as, for example, oil to gas or oil to water. While known AICDs are effective at providing selective flow control in accordance with fluid types, their design provides them with limited utility for accommodating a forward flow of a gas, particularly at high flow rates. The device of the present invention, on the other hand, is able to accommodate forward flow of a gas without autonomously closing during such forward flow by virtue of a geometry within the separation flow path which intentionally encourages an increase in static pressure. As such, the downhole flow control device may define a downhole gas flow control device.

At least one of the valve seat and the valve plate may define a geometry to reduce the velocity of fluid flow within the separation flow path. Such a reduction in velocity may serve to reduce the dynamic pressure while increasing static pressure.

At least one of the valve seat and the valve plate may define a geometry to increase friction experienced by fluid flowing through the separation flow path. Such friction may contribute to an increase in static pressure by establishing greater friction losses within the flow within the separation flow path. A geometry of at least one of the valve seat and the valve plate may define a roughened surface to increase friction experienced by fluid flowing through the separation flow path.

The separation flow path may extend in a radial direction, for example a radially outwardly and/or inwardly direction.

The valve plate may be mounted within a cavity formed within the housing. Both the inlet and outlet ports of the housing may open into the cavity. The valve seat surface may be formed in or on a wall surface of the cavity.

The valve plate may have a thickness which is less than a width or length. The valve plate may be provided by a thin plate. The valve plate may be mounted substantially transverse to a flow path through the inlet port. The valve plate may permit the device to provide a valve function within a low profile. Such a low profile may permit the device to be appropriately secured within a wall of a tubular with no or minimal protrusion either or both into the tubular or externally of the tubular.

Furthermore, the provision of a plate structure may permit the device to better react to reverse flow, providing a surface area sufficient to create a suitable closing force due to the fluid momentum of any such reverse flow, causing the valve plate to close.

The valve plate may be non-biased. For example, the flow control device may be absent of any biasing arrangement for biasing the valve plate in a particular direction.

As such, movement of the valve plate, for example towards a closed position, may not necessarily rely on a bias force, and instead may rely only on fluid interaction.

The valve plate may be generally circular in form. In other embodiments the valve plate may define any suitable shape, such as oval, polygonal or the like. The valve plate may define a valve disc.

The inlet surface of the valve plate may define a first region which is aligned with the inlet port of the housing. In such an arrangement inlet fluid flowing into the housing via the inlet port may impinge on the first region of the inlet surface. Fluid impinging on the first region of the inlet surface may be diverted, for example radially diverted into the separation flow path to flow towards the outlet port. Such fluid impingement on the first region of the valve plate may assist to drive the valve plate towards an open position. In some embodiments the area of the first region of the inlet plate may be sought to be maximised, for example by providing an increased area of the inlet port, to maximise the effect of fluid impingement on the valve plate to open and hold open said plate.

The inlet surface of the valve plate may define a second region which is aligned with the valve seat surface of the housing. The second region of the inlet surface may define a boundary or wall of the separation flow path. The second region may be located immediately adjacent the first region. The second region may be located outwardly from the first region. For example the second region may surround the first region, for example circumferentially surround. Alternatively, the second region may be located inwardly of the first region.

At least a portion of the second region of the inlet surface may be configured to engage the seat surface when the valve plate is in its closed position.

The device may comprise a sealing arrangement for providing sealing between the seat surface of the housing and the valve plate when said valve plate is in its closed position. The sealing arrangement may be defined between the second region of the inlet surface and the seat surface of the housing.

The separation flow path may define a flow inlet and a flow exit. The flow inlet may receive fluid entering the device via the inlet port of the housing. The flow inlet may be positioned immediately adjacent the inlet port of the housing. The flow inlet may be positioned at the boundary between the first and second regions of the valve plate.

A peripheral edge of the valve plate may define a flow exit of the flow path. Alternatively, or additionally, an aperture formed in the valve plate may define a flow exit of the separation flow path.

In some embodiments the cross-sectional flow area of the flow inlet of the separation flow path may be larger than the cross-sectional flow area of the inlet port of the housing. In such an arrangement flow entering the flow inlet of the separation flow path from the inlet port may be subject to a reduction in flow velocity and thus increase in static pressure.

The cross-sectional flow area of the separation flow path may increase over at least a portion of the separation flow path in the flow direction. Such an arrangement may facilitate a reduction in flow velocity along the separation flow path.

At least one of the valve seat and the valve plate (for example the inlet surface of the valve plate) may comprise a recessed region to define part of the separation flow path when the valve plate is in its open position. The recessed region may provide a region of increased flow area within the separation flow path. Such an increased flow area may encourage a lower flow velocity and thus lower dynamic pressure.

The recessed region may extend from a region adjacent the inlet port, such that fluid entering via the inlet port immediately flows into the recessed region.

The recessed region may be provided only in the second region of the inlet surface of the valve plate. Alternatively, the recessed region may be provided in both the first and second regions of the inlet surface of the valve plate.

The recessed region may define a base surface which forms a boundary of the separation flow path. At least a portion of the base surface may be substantially planar. At least a portion of the base surface may be defined by one or more sloping surfaces.

In some embodiments the recessed region may be provided on the seat surface. In such an embodiment the recessed region may surround a periphery of the inlet port.

In some embodiments the recessed region may be provided on the valve plate. In some embodiments the recessed region may be aligned with the inlet port, such that inlet flow impinges on the recessed region and then deflected towards the separation flow path.

The recessed region may be provided adjacent a raised region formed in at least one of the valve seat and the valve plate. A stepped region, for example an abrupt stepped region may be defined between the recessed region and adjacent raised region. Such a stepped region may facilitate flow disruption and reduced flow velocity, encouraging an increase in static pressure.

In other embodiments a ramped region may be defined between the recessed region and adjacent raised region.

The raised region may function to provide engagement between the valve plate and seat surface when the valve plate is in a closed position. The provision of the recessed region and adjacent raised region may facilitate both a sufficient cross-sectional flow area along the flow path, while permitting a small separation gap at the raised region to be maintained between the valve plate and seat surface. Accordingly, the increased cross-sectional flow area in the recessed region may assist to reduce fluid velocity during forward flow, to contribute to holding the valve plate in its open position. Further, the minimum separation gap at the raised region may assist to permit the valve plate to move towards its closed position in the event of reverse flow.

At least one of the valve plate and the valve seat may comprise a protruding feature which protrudes into the separation flow path. The protruding feature may define a raised region with an adjacent recessed region. The protruding feature may extend substantially transverse into the separation flow path.

The protruding feature may function to disrupt flow within the separation flow path, for example to increase fluid drag within the separation flow path. The protruding feature may encourage flow separation within the separation flow path. The protruding feature may reduce the fluid velocity within the separation flow path, thus encouraging an increase in static pressure. The protruding feature may encourage stagnation of at least a portion of flow within the separation flow path, for example by fluid impinging on the protruding feature, thus providing an increase in static pressure.

The protruding feature may be non-streamlined.

The protruding feature may be provided around a periphery of the inlet port.

The protruding feature may be provided on the valve seat.

The protruding feature may be provided on the valve plate. In one embodiment the protruding feature may be provided on a peripheral edge, for example a rim, of the valve plate. In some embodiments the protruding feature may be provided inwardly from a peripheral edge of the valve plate.

The protruding feature may be continuous. In some embodiments the protruding feature may be discontinuous, for example by including one or more gaps therein.

The protruding feature may be defined by a rib, lip, rim or the like.

A single protruding feature may be provided. Alternatively, multiple protruding features may be provided. All protruding features may be provided on one of the valve seat and valve plate. At least one protruding feature may be provided on the valve seat and at least one protruding feature may be provided on the valve plate.

At least two protruding features may be concentrically arranged.

The protruding feature, which may be provided on one of the valve plate and valve seat, may define a sealing face configured to sealingly engage the other of the valve plate and the valve seat when the valve plate is in its closed position. Providing a sealing face on the protruding feature may effectively reduce the sealing area within the device, thus effectively increasing the sealing pressure.

A single protruding feature may be provided. Alternatively, multiple protruding features may be provided. All protruding features may be provided on one of the valve seat and valve plate. At least one protruding feature may be provided on the valve seat and at least one protruding feature may be provided on the valve plate.

At least two protruding features may be concentrically arranged.

The inlet port may face axially relative to the housing, for example by being provided in an end face thereof. The inlet port may face radially relative to the housing, for example by being provided in a side wall of the housing.

The inlet port may be centrally positioned on the housing. The inlet port may be arranged eccentrically positioned on the housing.

A single inlet port may be provided.

Multiple inlet ports may be provided. For example, multiple inlet ports may be arranged circumferentially on the housing.

The inlet port may be defined within the housing. Alternatively, the inlet port may be formed in a separate structure which is secured to the housing. For example, the inlet port may be defined in a nozzle plate which is secured to the housing.

The outlet port may face axially relative to the housing, for example by being provided in an end face thereof. The outlet port may face radially relative to the housing, for example by being provided in a side wall of the housing.

The outlet port may be centrally positioned on the housing. The outlet port may be arranged eccentrically positioned on the housing. The outlet port may be positioned radially outwardly of the inlet port.

A single outlet port may be provided.

Multiple outlet ports may be provided. For example, multiple outlet ports may be arranged circumferentially on the housing. Circumferentially arranged outlet ports may be arranged radially outwardly of the inlet port.

The flow control device may be for use within a wellbore completion system, such as a production completion, injection completion, multi-purpose completion or the like. The wellbore completion, when installed within a wellbore, may comprise or define several zones. In use, at least one downhole flow control device may be installed at several intervals along the length of the completion system. In such an arrangement, the downhole flow control devices may assist to prevent cross flow between zones.

The housing may be secured to a tubular my any suitable mechanism, for example screwing, welding, interference fitting or the like.

The housing may comprise a connection assembly to facilitate connection to a tubular. The connection assembly may comprise a thread for engaging a thread in a tubular.

In some embodiments the valve plate may be disk-shaped and the inlet port may be defined by a circular bore. In some embodiments the diameter of the valve plate may be in the range of 1.5 to 3.5 times the diameter of the inlet port. Such an arrangement may minimise the extent of the separation flow path. In some embodiments the diameter of the valve plate may be in the range of 2 to 3 times the diameter of the inlet port. For example, the diameter of the valve plate may be approximately 2.5 times the diameter of the inlet port.

An aspect of the present invention relates to a wellbore tubular, comprising:
  a wall defining a port; and
  a flow control device mounted within the port, wherein the flow control device comprises:
    a housing comprising an inlet port, an outlet port and a valve seat surface surrounding the inlet port;
    a valve plate mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet,
    wherein at least one of the valve seat and valve plate defines a geometry to encourage an increase in static pressure of fluid flow in the separation flow path when said valve plate is in its open position.

The wellbore tubular may comprise a screen material surrounding at least a portion of said wellbore tubular.

A plurality of flow control devices may be provided within a corresponding plurality of ports in the wall of the tubular. A plurality of flow control devices may be circumferentially arranged around the tubular, A plurality of flow control devices may be axially arranged along the tubular.

The wellbore tubular may comprise or define connectors at opposing ends thereof. Such connectors may facilitate connection of the wellbore tubular within a tubing string.

The wellbore tubular may comprise or be define by coiled tubing.

The wellbore tubular may comprise at least one packer for providing sealing between the wellbore tubular and a wellbore surface. The packer may comprise any suitable packer, such as a mechanical set packer, inflatable packer, swellable packer or the like.

The flow control device may be provided by a downhole flow control device according to any other aspect.

An aspect of the present invention relates to a wellbore completion, comprising:
  a wellbore tubular; and
  a flow control device mounted within a wall of the tubular, wherein the flow control device comprises:
    a housing comprising an inlet port, an outlet port and a valve seat surface surrounding the inlet port;
    a valve plate mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet,
    wherein at least one of the valve seat and valve plate defines a geometry to encourage an increase in static pressure of fluid flow in the separation flow path when said valve plate is in its open position.

The wellbore tubular may be provided in accordance with any other aspect.

The wellbore completion may comprise at least one packer for providing sealing between the wellbore tubular and a wellbore surface. When such a packer is set, at least two wellbore zones may be defined. The packer may comprise any suitable packer, such as a mechanical set packer, inflatable packer, swellable packer or the like.

The wellbore completion may comprise at least one flow control device mounted on one axial side of a packer, and at least one flow control device on an opposite axial side of the packer.

An aspect of the present invention relates to a method for controlling flow downhole, comprising:
  positioning a tubular within a wellbore with a downhole flow control device in accordance with any other aspect mounted in a wall thereof.

An aspect of the present invention relates to a method for controlling flow downhole, comprising:
  flowing a fluid in a first direction through a flow control device mounted in a wall of a tubular positioned within a wellbore; and
  increasing the static pressure of the fluid within the flow control device during flow in the first direction to assist to maintain a valve plate of the flow control device in an open position.

The method may comprise causing the valve plate to close in the event of flow in a second direction opposite the first direction.

An aspect of the present invention relates to a downhole flow control device, comprising:
  a housing to be secured within a wall of a tubular and comprising an inlet port, an outlet port and a valve seat surface surrounding the inlet port;
  a valve plate mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet, wherein at least one of the valve seat and valve plate comprises a rib extending from a surface thereof and into the separation flow path when said valve plate is in its open position.

An aspect of the present invention relates to a downhole flow control device, comprising:

a housing to be secured within a wall of a tubular and comprising an inlet port, an outlet port and a valve seat surface surrounding the inlet port;

a valve plate mounted within the housing to move between an open position in which the valve plate is separated from the valve seat surface to define a separation flow path therebetween to permit flow in a forward direction from the fluid inlet to the fluid outlet, and a closed position in which the valve plate is engaged with the valve seat surface to close the separation flow path to restrict flow in a reverse direction from the fluid outlet to the fluid inlet, wherein at least one of the valve seat and valve plate comprises a recessed region to define part of the separation flow path when the valve plate is in its open position.

The recessed region may provide a region of increased flow area within the separation flow path. Such an increased flow area may encourage a slower flow velocity and thus lower dynamic pressure.

Features defined in relation to one aspect may be provided in combination with one or more other aspects.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
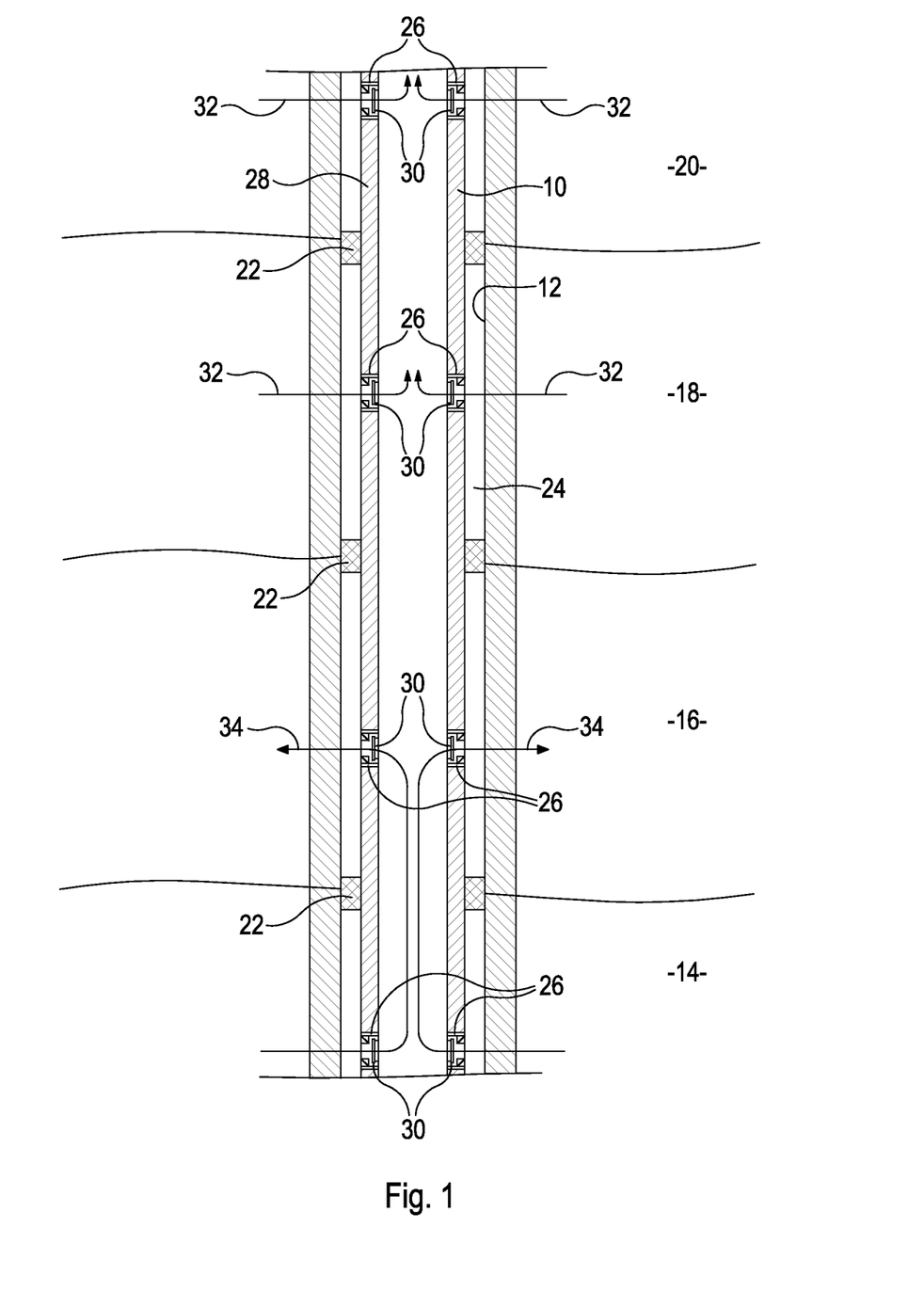
FIG. 1 is a diagrammatic illustration of a downhole completion system positioned within a drilled bore in accordance with an embodiment of the present invention.

FIG. 1 illustrates a wellbore completion tubing string 10 according to an embodiment of the present invention installed within a drilled bore 12. Although a vertical bore orientation is illustrated, both horizontal and deviated bores are also possible. The bore 12 extends through multiple zones 14, 16, 18, 20 of a subterranean formation, wherein each zone may include different pressures and/or fluid compositions. In the present embodiment one or more of the zones 14, 16, 18, 20 includes a gas, such as a hydrocarbon gas, and the wellbore completion tubing string 10 is intended to support production of gas towards surface.

The completion tubing string 10 includes a number of packers 22, such as swellable packers, which provide zonal isolation between the different formation zones 14, 16, 18, 20, preventing migration between different zones along an annulus 24 formed between the completion string 10 and the wellbore 12.

The completion tubing string 10 also includes a plurality of flow control devices 30 according to an embodiment of the present invention mounted (for example threadedly mounted) in respective ports 26 in the wall 28 of the completion tubing string 10. In the present embodiment two flow control devices 30 are positioned intermediate each pair of packers 22 and thus aligned with respective zones 14, 16, 18, 20. However, generally, one or more flow control devices 30 may be positioned between pairs of packers 22.

As will be described in more detail below, each flow control device 30 is configured to permit forward or inflow of gas from the formation zones and into the completion tubing string 10, as illustrated by arrows 32. The flow control devices 30, however, automatically close in the event of any reverse or outflow. Such an arrangement may prevent outflow during a shut-in condition, for example by cross-flow, as illustrated by arrows 34, between different formation zones (e.g., adjacent zones 14, 16) of differing pressures.

Although not illustrated in FIG. 1, the completion tubing string 10 may further comprise one or more wellbore screens (e.g., filter screens) arranged such that inflow must first flow through the screen material prior to flowing through the flow control devices.

It is known in the art to utilise flow control devices known as Autonomous Inflow Control Devices (AICDs) to facilitate inflow of a fluid from a formation into a wellbore completion. Such AICDs function to permit inflow of fluids of a high viscosity, such as oil, while automatically closing to prevent inflow of fluids of a lower viscosity, such as water or gas. As such, conventional AICDs may not be suitable for a gas inflow application.

Figure 2:
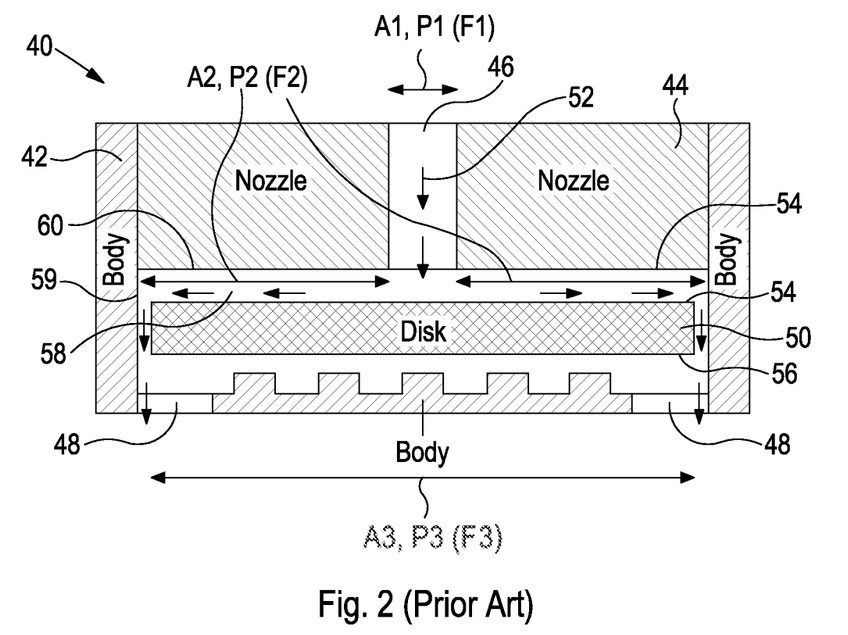
FIG. 2 is a diagrammatic illustration of a known AICD shown in an open configuration.
Figure 3:
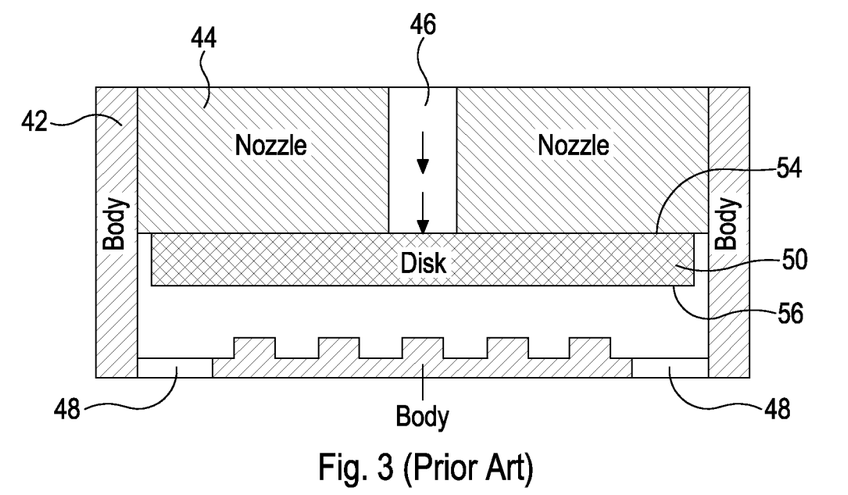
FIG. 3 is a diagrammatic illustration of the AICD of FIG. 2, shown in a closed configuration.

FIG. 2 provides a diagrammatic cross-sectional illustration of a known AICD, generally identified by reference numeral 40. The AICD 40 includes a housing or body 42 which is arranged to be secured within a port in a completion tubing. Mounted within the body 42 is a nozzle 44 which defines a central inlet port 46. The body 42 defines a plurality of circumferentially arranged outlet ports 48. A disk 50 is moveably mounted within the body 42. The disk 50 is shown in FIG. 2 in an open position such that flow is permitted, in the direction of arrows 52, from the inlet port 46 to the outlet ports 48. The disk 50 is shown in FIG. 3 in a closed position such that flow is prevented.

In use, the disk 50 will be caused to move (or levitate) by opposing forces created by pressures applied on opposing inlet and outlet faces 54, 56 of the disk 50. Specifically, inlet pressure P1 will be applied over area A1 of the inlet face 54 of the disk 50, generating a force F1 acting downwardly. Fluid flowing along the space 58 defined between the inlet face 54 of the disk 50 and an inner surface 60 of the nozzle 44 will define a flowing fluid pressure P2 applied over area A2, generating a force F2 also acting downwardly. Outlet pressure P3 will be applied over the outlet face 56 of the disk 50, which has area A3, generating force F3 acting upwardly. In this respect when the sum of forces F1 and F2 exceeds the force F3, the disk 50 will move to the open position as shown in FIG. 2. When the force F3 exceeds the sum of forces F1 and F2, the disk 50 will move to a closed position, illustrated in FIG. 3.

During flow of a viscous fluid, such as oil, fluid velocity in the space 58 will be such that the static pressure is sufficient, when applied over area A2, to assist to move the disk 50 towards its open position. However, during flow of a less viscous fluid, such as water or a gas, an increase in fluid velocity in the space 58 will occur, resulting in a higher dynamic pressure and lower static pressure. As such, the effective pressure acting over area A2 will be less, causing the force F3 to dominate and move the disk 50 towards the closed position, as shown in FIG. 3. Furthermore, higher velocity gas will exit the space 58, impinging on the internal side wall 59 of the body 42, with the stagnation pressure developed effectively being applied on the outlet face 56 of the disk 50, contributing to a closing force.

Figure 4:
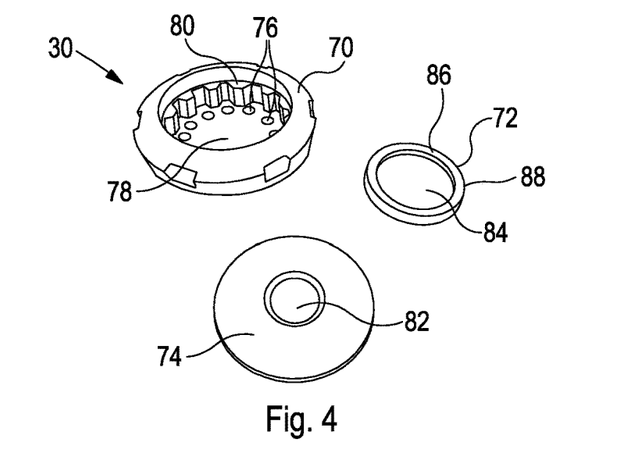
FIG. 4 is an illustration of individual disassembled components of a downhole flow control device in accordance with an embodiment of the present invention.

FIG. 4 illustrates individual components of a downhole flow control device 30 of FIG. 1, wherein the components are shown in a disassembled configuration. The device 30 includes a housing 70, a valve plate 72 and a nozzle plate 74. The housing 70 includes or defines a plurality of circumferentially arranged outlet ports 76, and a cavity 78 which, as will be described in more detail below, is configured to receive and accommodate the valve plate 72. The housing defines a circumferential support surface 80 within the cavity which, as will be described in more detail below, is configured to support the nozzle plate 74. However, in other embodiments the nozzle plate 74 may be integrally formed with and form part of the housing 70. The nozzle plate 74 defines a port 82 which, in use, functions as an inlet port of the device/housing. The valve plate 72 is defined by a round disk which includes a central circular recessed region 84 defined by a raised circumferential rib or lip 86 around the periphery 88 of the plate 72, As will be described in more detail below, in the present embodiment the geometry of the valve plate 72 encourages or provides an increase in the static pressure of a fluid flowing through the device 30.

Figure 5:
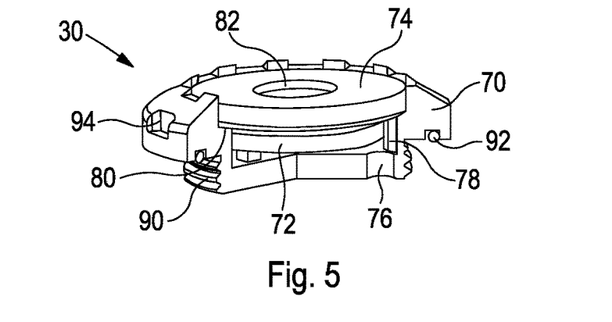
FIG. 5 is a part-sectional illustration of the assembled downhole flow control device of FIG. 4.

A partial sectional view of the device 30 of FIG. 4, when assembled, is illustrated in FIG. 5. As shown, the valve plate 72 is mounted within the cavity 78 of the housing 70, and the nozzle plate 74 is mounted and supported by the circumferential support surface 80. The housing 70 includes a male thread portion 90 which is intended to cooperate with a female thread portion provided in a port 26 (FIG. 1) of the tubing string 10 (FIG. 1). An O-ring seal 92 is provided on an axial face of the housing 70 and in use provides sealing engagement with the tubing string 10 (FIG. 1) when mounted therein. The housing 70 further includes a plurality of tool interface regions 94 which facilitate engagement of a suitable tool, such as a wrench, to tighten the device 30 within a port 26 (FIG. 1).

Figure 6:
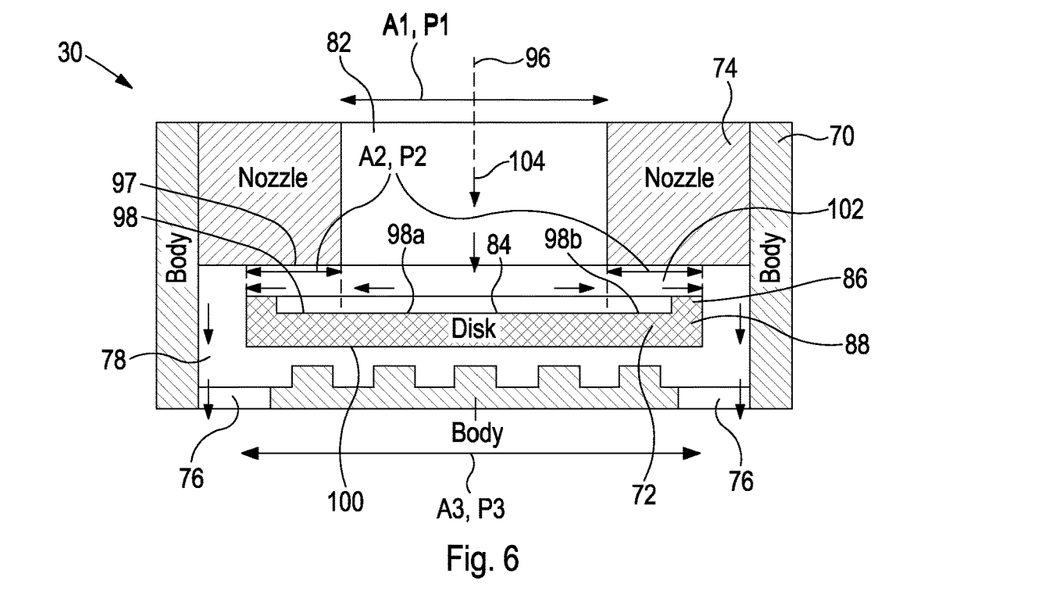
FIG. 6 is a diagrammatic illustration of the downhole flow control device of FIG. 5, shown in an open configuration.
Figure 7:
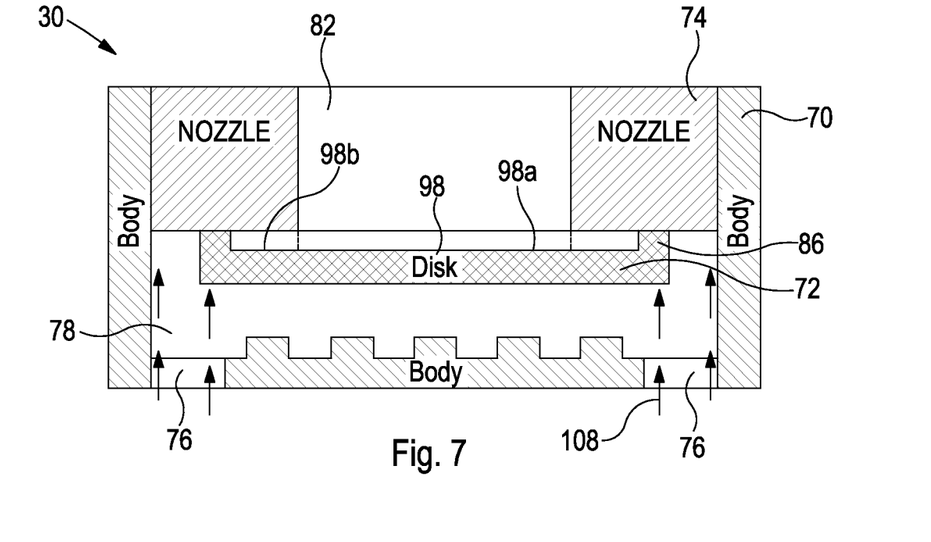
FIG. 7 is a diagrammatic illustration of the downhole flow control device of FIG. 5, shown in a closed configuration.

FIG. 6 provides a simplified diagrammatic cross-sectional illustration of the device 30, with both the nozzle 74 and valve plate 72 mounted within the housing 70. While the nozzle 74 is rigidly secured to the housing 70, the plate 72 is permitted to move in the direction of the central axis 96 within the housing cavity 78 to move between an open position as shown in FIG. 6 and a closed position as shown in FIG. 7. The underside or inner face of the nozzle 74 defines a valve seat surface 97 which surrounds the periphery of the inlet port 82 and faces a peripheral region of the valve plate 72. As will be described in more detail below, when the valve plate 72 is separated from the valve seat 97 flow may be permitted, whereas when the valve plate 72 engages the valve seat 97, flow may be prevented.

The valve plate 72 defines an upper or inlet surface 98 which generally faces in the direction towards the inlet port 82. The valve plate 72 also defines an opposing lower or outlet surface 100 which generally faces in the direction of the outlet ports 76.

Movement of the plate 50 is dependent on the forces generated over the respective inlet and outlet surfaces 98, 100, as will be described in more detail below.

The inlet surface 98 of the valve plate 72 defines a first region 98a which is aligned with the inlet port 82. As illustrated, the first region 98a may define an area A1. The inlet surface 98 of the valve plate 72 also defines a second region 98b which circumscribes the first region 98a and is aligned with the valve seat surface 97 of the nozzle 74. The second region 98a defines an area A2. Forces generated (for example by the effect of fluid pressure) over the inlet surface 98 (areas A1 and A2) will act to move the valve plate 72 towards its open position, whereas forces generated over the outlet surface 100 (area A3) will act to move the disk towards its closed position.

When the valve plate 72 is in its open position illustrated in FIG. 6 a radial separation flow path 102 is defined between the second region 98b of the disk inlet surface 98 and the valve seat surface 97 of the nozzle 74. As such, during forward flow in the direction of arrows 104 fluid will enter the inlet port 82 and impinge on the first region 98a of the disk inlet surface 98 and be deflected radially outwardly into the separation flow path 102, ultimately exiting the device via the outlet ports 76.

As described above, the valve plate 72 includes an upstanding circumferential rib or lip 86 around the peripheral edge 88 of the valve plate 72 so as to define the central recess 84. Such an arrangement permits an inlet flow area 104 to the separation flow path 102 to be increased and in some embodiments to be larger than the area A1 of the inlet port 82. Such an arrangement may cause a reduction in fluid velocity upon entry to the separation flow path 102, encouraging a reduction in dynamic pressure and increase in static pressure, contributing to a larger opening force being applied on the valve plate 72. Such an arrangement may permit the device 30 to accommodate gas flow.

Furthermore, the circumferential rib or lip 86 extends transversely into the separation flow path 102 and functions to generate drag within the flow therethrough, with the resulting effect of increasing pressure within said separation flow path 102, contributing to a larger opening force being applied on the valve plate 72.

In some embodiments a surface, for example the inlet surface 98 or regions thereof may have a roughened surface to generate further fluid drag to seek to contribute to a higher opening force applied on the valve plate 72 during forward flow.

When a pressure differential between inlet and outlet of the device 30 reduces or reverses, and/or when reverse flow through the device from outlet to inlet initiates, the valve plate 72 will be caused to move towards its closed position, as shown in FIG. 7, reference to which is now made. In this respect, the disk shape of the valve plate 72 provides a relatively large frontal area to reverse flow (illustrated by arrows 108), permitting the reverse flow to move the plate 72 towards its closed position. When in the closed position the circumferential rib 86 of the valve plate 72 engages the valve seat 97 of the nozzle 74 to generate a seal therebetween. In this respect the rib 86 provides a surface area which is smaller than that of the second region 98*b* of the inlet surface 98 of the valve plate 72 and as such for the same closing force an increase in sealing pressure may be attained.

Furthermore, the rib 86 permits a small separation gap to be maintained relative to the seat surface 97. The minimum separation gap may assist to permit the valve plate 72 to move towards its closed position in the event of reverse flow.

Figure 8:
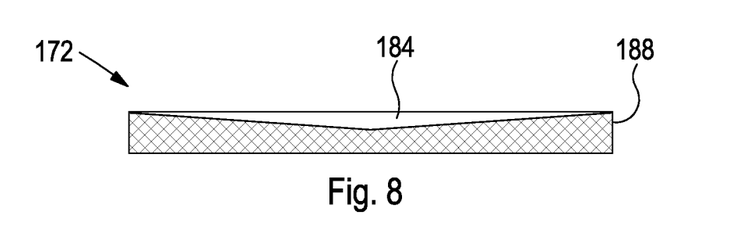
FIGS. 8 to 10 are diagrammatic illustrations of alternative valve plate designs for use in a flow control device according to embodiments of the present invention.

In the embodiment described above the valve plate 72 is in the form of a disk with a central recess 84 defined by a peripheral rib 86. However, other forms of valve plate may be utilised which provide a similar effect of causing or encouraging an increase in static pressure through a separation flow path. One exemplary alternative valve plate form is illustrated in FIG. 8, wherein the valve plate is identified by reference numeral 172. In this arrangement the valve plate 172 again includes a central recess 184 having sloping surfaces of generally shallow conical form, extending continuously upwardly to a peripheral edge 188 of the plate.

Figure 9:
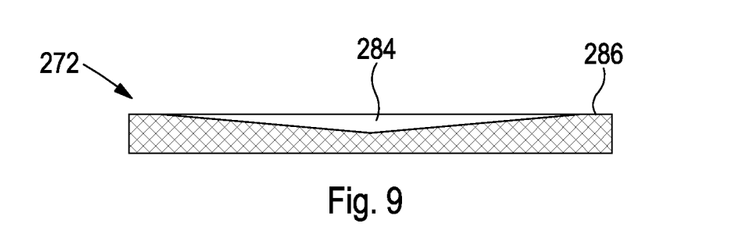

FIG. 9 provides a further alternative form of a valve plate, in this case identified by reference numeral 272. In this case the plate 272 comprises a central conical recess 284 which extends outwardly to a planar rim surface 286. When the valve plate 272 is mounted within a housing, such as housing 70 of FIG. 4, the planar rim surface 286 functions to engage the valve seat 97 of the nozzle 74 to establish sealing therewith when the valve plate 272 is in a closed position.

Figure 10:
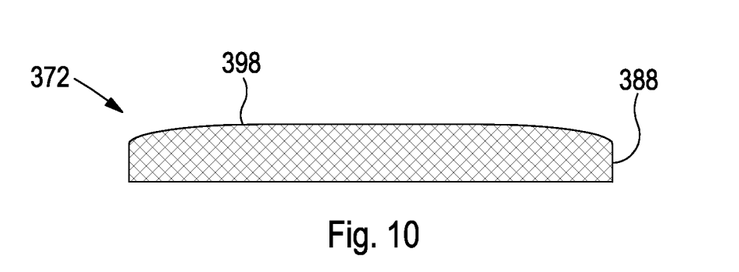

FIG. 10 provides a further alternative form of a valve plate, in this case identified by reference numeral 372. In this case an inlet surface 398 of the valve plate 372 is generally dome-shaped, curving downwardly towards a peripheral edge 388 of the plate 372. In such an embodiment, in use, as fluid flows along a separation flow path defined between the inlet surface 398 and the valve seat 97 of the nozzle 74 (FIG. 6), the cross-sectional flow area will continuously increase, thus causing a reducing dynamic pressure with increase in static pressure.

Figure 11:
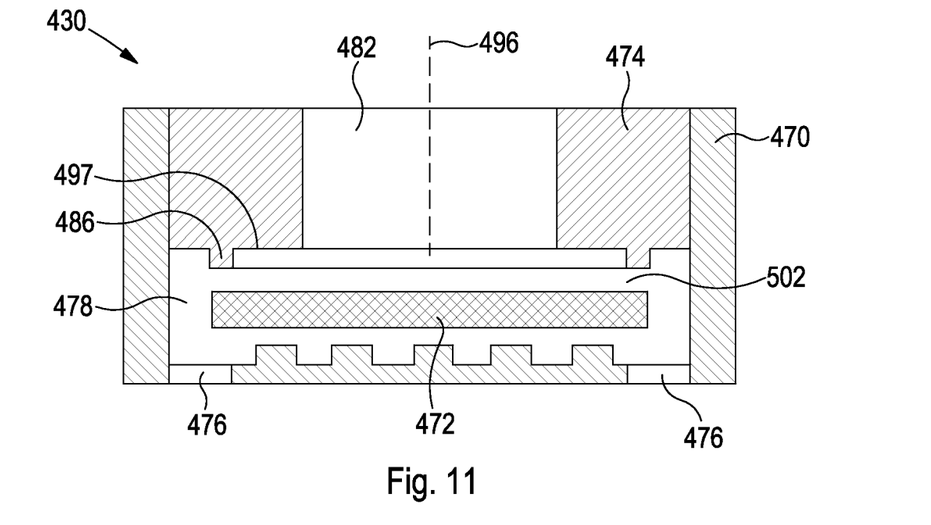
FIG. 11 is a diagrammatic illustration of a downhole flow control device according to an alternative embodiment of the present invention.

Reference is now made to FIG. 11 which is a diagrammatic illustration of a flow control device, generally identified by reference numeral 430, in accordance with an alternative embodiment of the present invention. The flow control device 430 is similar in form and function to that shown in FIG. 6, and as such like features share like reference numerals, incremented by 400. Accordingly, the device 430 includes a housing 470 having a number of circumferentially arranged outlet ports 476. A nozzle plate 474 is mounted in the housing 470, wherein the nozzle plate 474 defines an inlet port 482. A valve plate 472 is mounted within a cavity 478 formed in the housing 470 and is moveable along axis 496 between open and closed positions. In FIG. 11 the valve plate 472 is arranged in an open position to define a separation flow path 502 with a valve seat surface 497 of the nozzle plate 474.

In the present embodiment the valve plate 472 defines a generally planar inlet surface 498, whereas a circumferential rib 486 protrudes from the valve seat surface 497 and into the separation flow path 502. This circumferential rib 486 provides largely the same function as the rib 86 of the device 30 shown in FIG. 6, in terms of encouraging an increase in static pressure to contribute to an opening force on the valve plate 472. Further, when the valve plate 472 is moved towards a closed position the inlet surface 498 of the plate 472 sealingly engages the rib 486.

Figure 12:
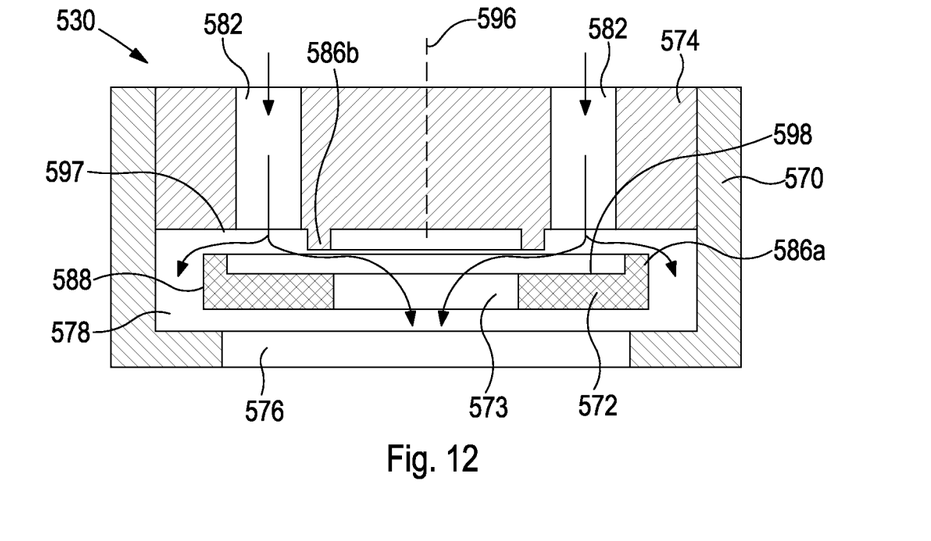
FIG. 12 is a diagrammatic illustration of a downhole flow control device according to a further alternative embodiment of the present invention.

Reference is now made to FIG. 12 which is a diagrammatic illustration of a flow control device, generally identified by reference numeral 530, in accordance with a further alternative embodiment of the present invention. The flow control device 530 is similar in form and function to that shown in FIG. 6, and as such like features share like reference numerals, incremented by 500.

The device 530 includes a housing 570 having a centrally arranged outlet port 576. A nozzle plate 574 is mounted within the housing 570, wherein the nozzle plate 574 defines a plurality of circumferentially arranged inlet ports 582. A valve plate 572 is mounted within a cavity 578 formed in the housing 570 and is moveable along axis 596 between open and closed positions. In FIG. 12 the valve plate 572 is arranged in an open position to define a separation flow path 602 with a valve seat surface 597 of the nozzle plate 474. In such an open position flow may enter the device 530 via the inlet ports 582 and flow both radially inwardly and outwardly to flow over a peripheral edge 588 of valve plate 572 and through the central port 573, with fluid then permitted to exit via outlet port 576.

In the present embodiment the valve plate 572 defines a central aperture or port 573. A first circumferential rib 586*a* protrudes into the separation flow path 602 from an inlet surface 598 of the valve plate 572. A second circumferential rib 586*b* protrudes from the valve seat surface 597 at a position radially inwardly of the inlet ports 582 and into the separation flow path 602. The first and second circumferential ribs 586*a*, 586*b* provide largely the same function as the rib 86 of the device 30 shown in FIG. 6, in terms of encouraging an increase in static pressure to contribute to an opening force on the valve plate 572. Further, when the valve plate 572 is moved towards a closed position the ribs 586*a*, 586*b* provide a sealing function.

In further embodiments alternative rib positions may be provided. For example, and with reference again to FIG. 12, both the first and second ribs 586*a*, 586*b* may be mounted on either the valve plate 572 or the valve seat 597. Further, the first valve rib 586*a* may be positioned radially inwardly of the inlet ports 582, whereas the second rib 586*b* may be positioned radially outwardly of the inlet ports 582.

It should be understood that the embodiments described herein are merely exemplary and that various modifications may be made thereto without departing from the scope of the present invention.

The invention claimed is:

1. A downhole flow control device comprising:
    a housing comprising an inlet port, an outlet port and a valve seat surface surrounding the inlet port; and
    a valve plate mounted within the housing to move between an open position in which the valve plate is separated from the valve seat surface to define a separation flow path therebetween to permit flow in a forward direction from the inlet port to the outlet port, and a closed position in which the valve plate is engaged with the valve seat surface to close the separation flow path to restrict flow in a reverse direction from the outlet port to the inlet port,
    wherein the valve plate:
        defines a recessed region, the recessed region defining part of the separation flow path when the valve plate is in the open position,
        encourages an increase in static pressure of fluid flow in the separation flow path when said valve plate is in the open position, and
        includes a raised circumferential rib extending around the periphery of the valve plate and defining a protruding feature, and
    wherein the raised circumferential rib provides engagement between the valve plate and the valve seat surface when the valve plate is in the closed position, and the raised circumferential rib reduces a separation gap between the valve plate and the seat surface to assist in permitting the valve plate to move towards the closed position in the event of reverse flow.

2. The downhole flow control device according to claim 1, wherein the valve plate is moved towards its open position in response to flow in the forward direction, and moves towards its closed position in response to flow in the reverse direction.

3. The downhole flow control device according to claim 1, wherein
the valve plate defines an inlet surface and an outlet surface opposed to the inlet surface; and
in use, inlet or upstream pressure applied over the inlet surface of the valve plate acts to urge the valve plate towards its open position, and outlet or downstream pressure applied over the outlet surface of the valve plate acts to urge the valve plate towards its closed position.

4. The downhole flow control device according to claim 3, wherein the inlet surface of the valve plate defines a first region which is aligned with the inlet port of the housing and a second region which is aligned with the valve seat surface of the housing.

5. The downhole flow control device according to claim 1, wherein at least one of the valve seat and valve plate defines a geometry to encourage a reduction in dynamic pressure with a corresponding increase in static pressure of fluid flow in the separation flow path when said valve plate is in its open position.

6. The downhole flow control device according to claim 1, for use as a downhole gas flow control device.

7. The downhole flow control device according to claim 1, wherein at least one of the valve seat and the valve plate define a geometry to reduce a velocity of fluid flow within the separation flow path.

8. The downhole flow control device according to claim 1, wherein at least one of the valve seat and the valve plate define a geometry to increase friction experienced by fluid flowing through the separation flow path.

9. The downhole flow control device according to claim 1, wherein a geometry of at least one of the valve seat and the valve plate defines a roughened surface to increase friction experienced by fluid flowing through the separation flow path.

10. The downhole flow control device according to claim 1, wherein the valve plate is mounted within a cavity formed within the housing, wherein the inlet and outlet ports of the housing open into the cavity.

11. The downhole flow control device according to claim 1, wherein the separation flow path defines a flow inlet and a flow exit, said flow inlet for receiving fluid entering the device via the inlet port of the housing.

12. The downhole flow control device according to claim 11, wherein a peripheral edge of the valve plate defines the flow exit of the flow path.

13. The downhole flow control device according to claim 11, wherein an aperture formed in the valve plate defines the flow exit of the separation flow path.

14. The downhole flow control device according to claim 1, wherein the recessed region extends from a region adjacent the inlet port.

15. The downhole flow control device according to claim 1, wherein the recessed region is provided on the valve plate.

16. The downhole flow control device according to claim 15, wherein the recessed region is aligned with the inlet port, such that inlet flow impinges on the recessed region and then deflected towards the separation flow path.

17. The downhole flow control device according to claim 1, wherein the recessed region is provided adjacent a raised region formed in at least one of the valve seat and the valve plate.

18. The downhole flow control device according to claim 17, wherein the raised region provides engagement between the valve plate and seat surface when the valve plate is in the closed position.

19. The downhole flow control device according to claim 17, wherein the raised region provides a smaller separation gap between the valve plate and the seat surface than the recessed region to assist to permit the valve plate to move towards its closed position in the event of reverse flow.

20. The downhole flow control device according to claim 1, wherein the protruding feature protrudes into the separation flow path.

21. The downhole flow control device according to claim 20, wherein the protruding feature extends substantially transverse into the separation flow path.

22. The downhole flow control device according to claim 20, wherein the protruding feature is provided around a periphery of the inlet port.

23. The downhole flow control device according to claim 20, wherein multiple protruding features are provided.

24. The downhole flow control device according to claim 20, wherein the protruding feature defines a sealing face configured to sealingly engage the valve seat when the valve plate is in its closed position.

25. The downhole flow control device according to claim 1, wherein the inlet port is formed in a separate structure which is secured to the housing.

26. A method for controlling flow downhole, comprising:
flowing a fluid in a first direction through the flow control device of claim 1 mounted in a wall of a tubular positioned within a wellbore; and
increasing a static pressure of the fluid within the flow control device during flow in the first direction to assist to maintain the valve plate of the flow control device in an open position.

* * * * *